(No Model.) 5 Sheets—Sheet 1.
D. B. MORISON.
STAMPING APPARATUS.
No. 591,560. Patented Oct. 12, 1897.
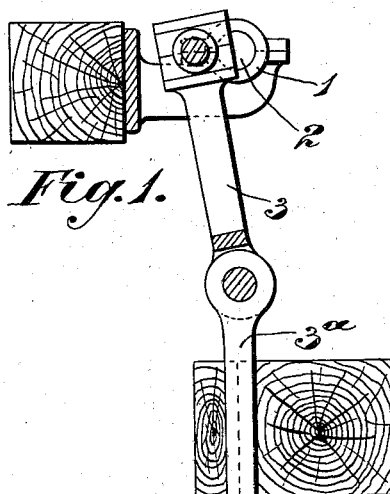
Fig.1.
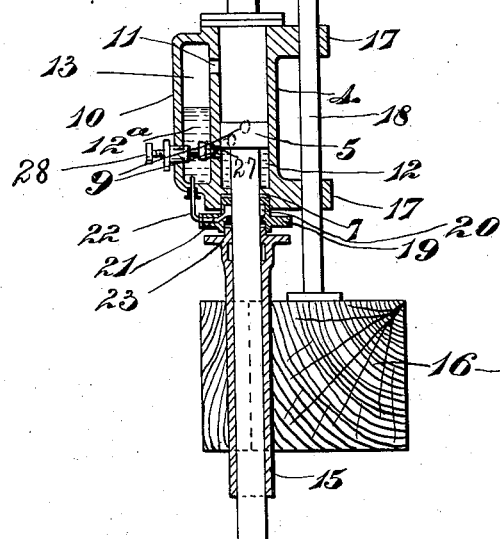
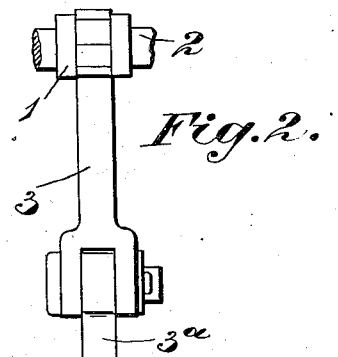
Fig.2.
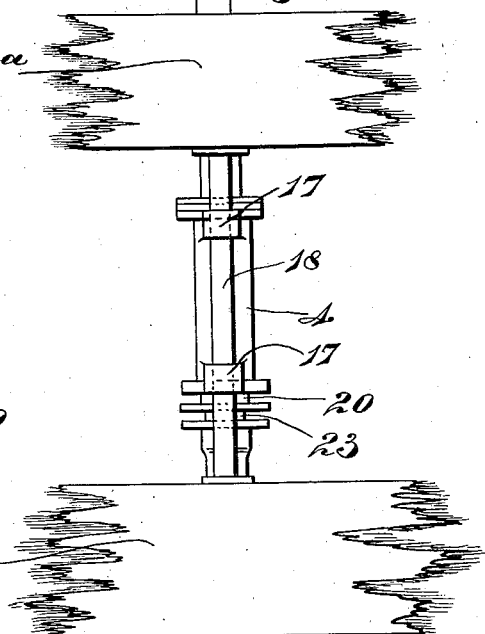
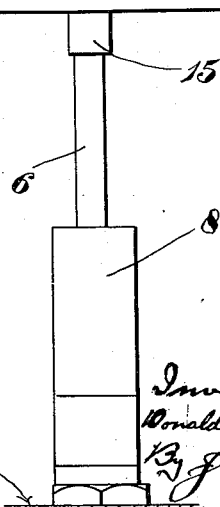
Witnesses:
M. C. Pinckney
C. Holloway
Inventor:
Donald B. Morison
By J&M Bowen
atty.

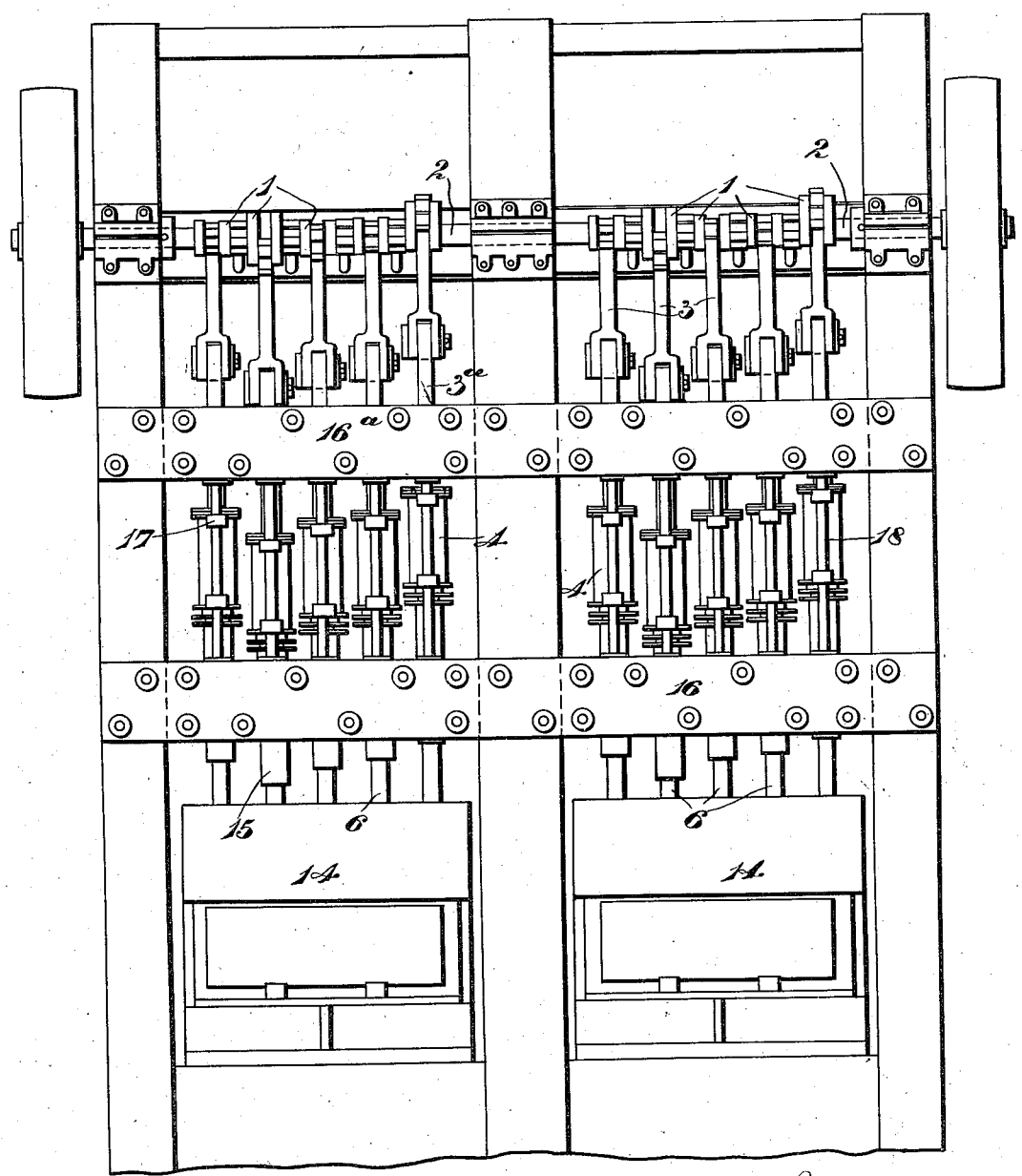

(No Model.) 5 Sheets—Sheet 3.
D. B. MORISON.
STAMPING APPARATUS.
No. 591,560. Patented Oct. 12, 1897.
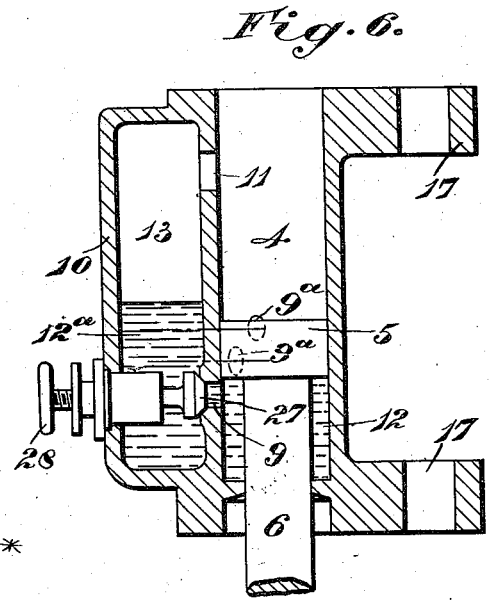
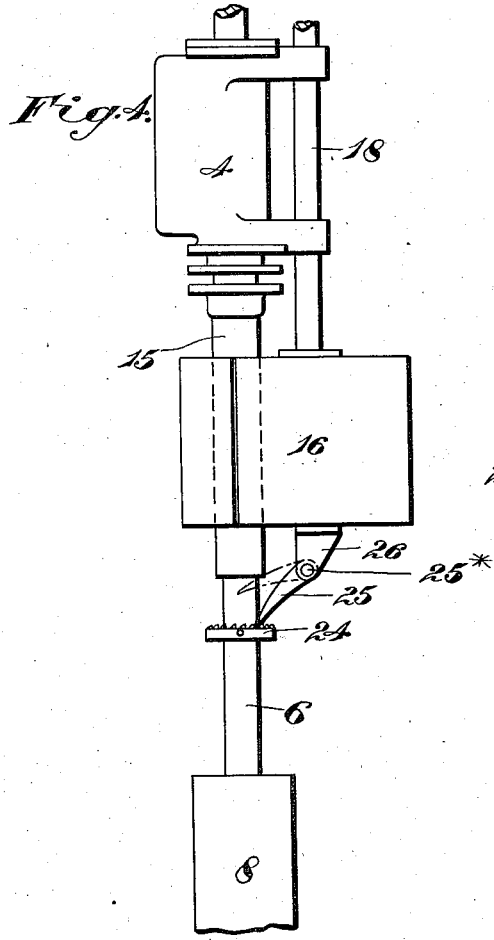
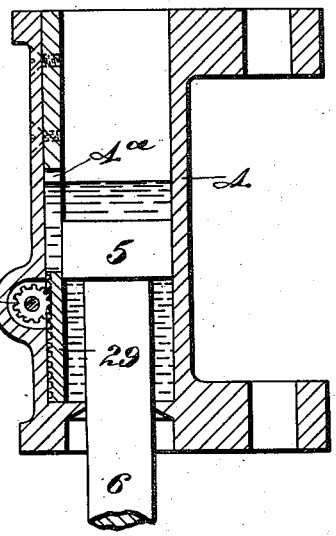
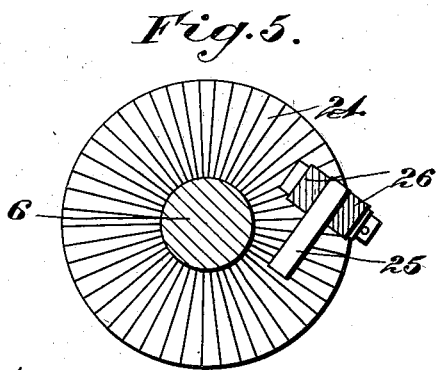
Witnesses:
W. C. Pinckney
C. Holloway
Inventor:
Donald B. Morison,
By J. E. M. Bowen
Atty.

(No Model.) 5 Sheets—Sheet 4.
D. B. MORISON.
STAMPING APPARATUS.
No. 591,560. Patented Oct. 12, 1897.
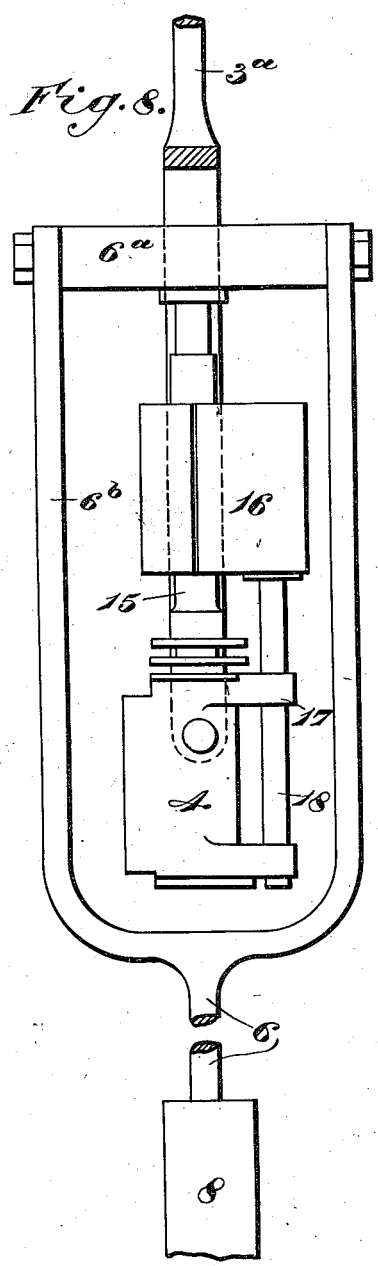
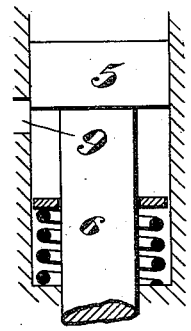
Witnesses:
M. C. Pinckney
C. Holloway
Inventor:
Donald B. Morison,
By J. E. M. Dowen
Atty.

(No Model.) 5 Sheets—Sheet 5.
D. B. MORISON.
STAMPING APPARATUS.
No. 591,560. Patented Oct. 12, 1897.
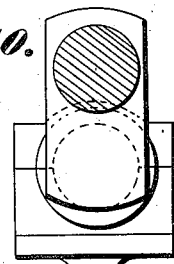
Fig. 10.
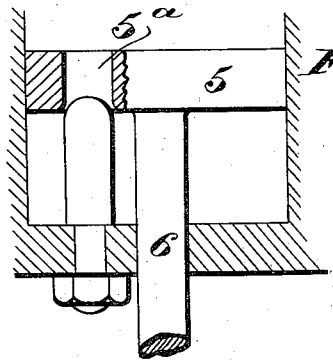
Fig. 12.
Fig. 11.
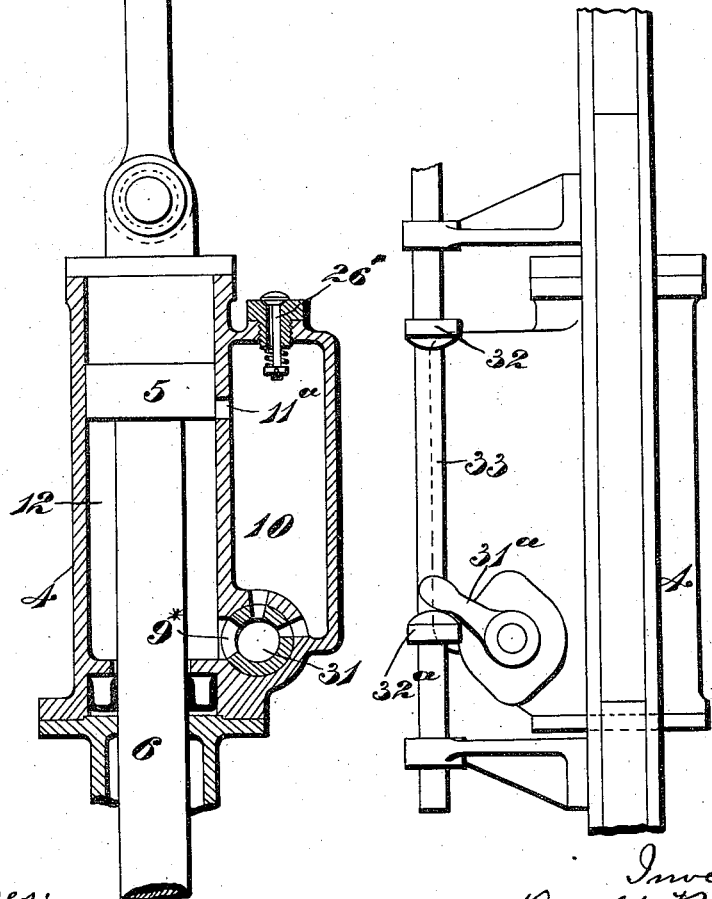
Witnesses:
M. C. Pinckney
C. Holloway
Inventor:
Donald B. Morison
By J.S.M. Dowen
Atty.

UNITED STATES PATENT OFFICE.

DONALD BARNS MORISON, OF HARTLEPOOL, ENGLAND.

STAMPING APPARATUS.

SPECIFICATION forming part of Letters Patent No. 591,560, dated October 12, 1897.

Application filed September 16, 1896. Serial No. 606,029. (No model.)

*To all whom it may concern:*

Be it known that I, DONALD BARNS MORISON, a subject of the Queen of Great Britain and Ireland, residing at Hartlepool, in the county of Durham, England, have invented a Stamping Apparatus, of which the following is a specification.

According to this invention the upward strokes of the stamps in a stamping, crushing, or hammering apparatus adapted for crushing minerals, ores, such as gold ores, and other substances or for other purposes for which such stamping or hammering apparatus is suitable are effected by the rising movement of positively-driven parts communicated to the stamps through bodies of liquid either alone or in combination with other elastic bodies, the downward or operative strokes being effected by the action of gravity, and for speeds at which the number of strokes in a given time exceed what is practically obtained by gravity (less retardation due to friction) the velocity of fall is increased by reason of the friction between the driving mechanism and the falling stamp.

Referring to the accompanying illustrative drawings, Figure 1 shows partly in cross-section and partly in side elevation, and Fig. 2 in front elevation, a stamp-head provided with one arrangement of operating mechanism according to this invention. Fig. 3 is a front elevation showing a battery of ten stamps provided with such operating mechanism.

In this arrangement to a crank 1 (or its equivalent) on a driving-shaft 2 is attached a connecting-rod 3, jointed by a vertically-guided rod 3ª to a cylinder 4, so that when the crank revolves the cylinder will be moved up and down in a straight line. Within the cylinder is a piston 5, the rod 6 of which passes through the cylinder-bottom and a stuffing-box 7 and constitutes the stem to which the stamp-head 8 is attached. At a distance above the bottom of the cylinder 4 there is a port 9, which communicates with a chamber 10, that is also in communication with the cylinder above the piston through a port 11. The cylinder below the lower port 9 is filled with liquid 12—for example, water—and the chamber 10 also contains liquid 12ª, above which is an air-space 13. With this arrangement when the bottom of the piston 5 closes the lower port 9 and the cylinder moves upward the piston 5 and stamp-head 8 will be supported by the cushion or buffer of liquid 12, and if none of this escapes and the strokes of the cylinder 4 per minute do not exceed the maximum number which the stamp-head 8 could make under the action of gravity minus the loss through friction, then if the stroke of the stamp-head is equal to the stroke of the cylinder the position of the piston 5 within the cylinder 4 will remain constant and the liquid 12 will be practically undisturbed. If, however, the strokes of the cylinder 4 are increased a number in a given time beyond the number of possible strokes of the stamp-head 8 due to gravity alone minus friction and if the lengths of the strokes of the stamp-head and the cylinder are equal, then the velocity of the cylinder in the early part of its stroke being in consequence of the cylinder being driven from a crank-pin in excess of the velocity of the falling weight due to gravity minus friction it follows that the friction between the piston 5 and the wall of the cylinder 4, as well as between the packing in the stuffing-box 7 and the piston-rod 6, will increase the velocity of the falling stamp-head up to the point of synchronism—that is to say, up to the point where the cylinder and stamp-head move at the same velocity. Consequently for all parts of the full stroke up to that point the velocity acquired by the stamp-head will be increased.

By increasing the length of the stroke of the cylinder beyond the length of the full stroke of the stamp-head the increased velocity imparted to the stamp-head will be still further increased. In the case of an eight-inch stroke of cylinder and a seven-inch stroke of piston and stamp-head at the end of the downstroke of each the position of the bottom of the piston would be higher in the cylinder than the point of cut-off, thus establishing communication between the cylinder 4 and the chamber 10 through the port 9 and allowing any deficiency of liquid through leakage or otherwise to be made up and at the same time compensating automatically for the wearing of the shoe and die. When the stamp-head is prevented from making its full stroke by the ore in the crushing-box 14, then the piston will be still higher within the cylinder at the end of the stroke of the latter by a proportionate distance and the volume of liquid below the piston in the cylinder will be increased. On the upstroke of the cylinder the surplus liquid will flow back into the chamber until the cut-off position is reached—that is to say, until the lower edge of the port passes the lower edge of the piston and so closes the port, thereby reducing the shock at the point from which the piston and stamp-head are raised. To further aid in reducing shock, the port 9 may advantageously be made of V shape, the smallest end of the port being at the bottom. It will be seen, therefore, that the differential motions of the cylinder and of the piston, particularly when the stroke of the cylinder is greater than the stroke of the piston, is such that a considerable increase in the number of strokes per minute can be obtained beyond those which are obtainable with the ordinary cam construction by reason not only of the reduced friction of mechanism, but also by the assisting effect of the friction between the wall of the cylinder 4 and the piston 5 and between the packing in the stuffing-box 7 and the rod 6. It will be obvious that to obtain the greatest number of blows in a given time with this arrangement the rate of rotation of the driving-shaft 2 must be such that the velocity of the cylinder 4 in the downstroke shall not be less than the possible velocity of the piston due to gravity minus friction. The retarding effect of friction to the downward movement of the stamp-head may be eliminated altogether by surrounding the piston-rod 6 with a sleeve 15, connected to the cylinder and arranged to work in the fixed transverse guide 16, through which the said rod ordinarily works. By this means the friction of the guide will be transferred from the falling rod to the positively-driven sleeve.

The cylinder 4 may be guided vertically in its movements by providing it with extensions 17, arranged to work on a guide-rod 18, fixed to the upper and lower transverse guides 16ᵃ 16, that form part of the framing of the apparatus.

In order to minimize the leakage of liquid from the cylinder 4 through the stuffing-box 7, the latter may be fitted with a gland 19, formed with an annular recess 20, into which any liquid passing down the rod will flow and whence it can pass back into the chamber 10 by a passage 21 and pipe 22. The tightness of the gland 19 may in this case be insured by a supplementary gland 23, which may conveniently be formed in one with the sleeve 15.

The chamber 10 may be arranged behind the cylinder 4, and, as will be seen from the drawings, can be made of a capacity which will admit of the apparatus being applied in connection with the stamp-heads of existing stamp-batteries and which are usually pitched at a distance apart of about ten inches from center to center. Fig. 3 shows the apparatus applied in connection with a stamp-battery containing ten stamp-heads. The applicability of the apparatus to existing stamp-batteries is a feature of considerable practical importance.

Any suitable means may be employed for imparting an intermittent rotary movement to the stamp-head when desired. Fig. 4 is an elevation, and Fig. 5 a plan in section, showing an arrangement for this purpose in which there is provided in connection with a toothed wheel 24, fixed on the rod 6, a pawl 25, carried by a bracket 26, the arrangement being such that the wheel 24 will engage the pawl 25 on the upstroke, and the pawl turning upon the center 25* will revolve the piston-rod by means of the attached wheel 24 through a small portion of a revolution.

The chamber 10 is or may be fitted with a valve 26′, Fig. 10, in the perforated cap or top of chamber 10, to allow for any variation of pressure in the chamber either above or below the pressure of the atmosphere.

Suitable means are provided when it is desired to be able to vary the stroke of the stamp-head. Fig. 6 is a vertical section showing one arrangement for this purpose, in which additional ports 9ᵃ are made in the side of the cylinder 4 at levels corresponding to the length of the stroke required. The ports 9 9ᵃ in such a case are each provided with a valve 27, capable of being readily controlled by a handle 28, so that ports not required for the time being can be readily closed and those which it is desired to use can be readily opened. In Fig. 6 the lower port 9 is shown closed, whereby the cylinder and piston are positively connected by the imprisoned liquid before the piston passes below port 9. In Fig. 1 port 9 is open and the piston and cylinder will not be connected, so as to move up together until the piston closes port 9. Fig. 7 is a vertical section showing another arrangement for this purpose in which the cylinder 4 has formed in its inner surface a longitudinal groove 4ᵃ, in which is an adjustable slide-bar 29, formed with a rack in gear with a pinion 30, by suitably moving which from the exterior of the cylinder the closing of the communication between the two ends of the cylinder by way of the said groove 4ᵃ can be caused to take place at any desired part of the stroke of the piston 5 relatively to the cylinder 4.

It will be evident that, if so desired, the piston may be connected to the crank, so as to be actuated thereby, in which case the stamp-stem will be attached to the cylinder, or, as represented in Fig. 8, the cylinder, actuated by the crank, instead of having a hole through the bottom may have the stuffing-box at its top, a cross-head 6ᵃ being attached to the upper end of the piston-rod and connected to an upwardly-extending bifurcated portion 6ᵇ of the stamp-stem 6. The cylinder may be prolonged below the cut-off port to such an extent that in the event of escape through leakage of the whole of the liquid from below the port the piston will not strike against the cylinder-bottom, or below the port there may be a spring adapted to act when necessary in lieu of liquid during the return or upward stroke of the positively-driven parts and stamp.

In Fig. 9 there is shown a spiral spring with an annular plate above it to act as a buffer and prevent damage of the cylinder or other parts in the event of the liquid from any cause being at any time wholly absent from the bottom of the cylinder. There might obviously be substituted for the spiral spring some other form of spring, such as an india-rubber buffer-spring.

If it is desired that the revolutions of the driving-shaft 2 shall be less in number than heretofore mentioned and that the apparatus shall still embody the requirements of a gravity-stamp, then at the lower end of the cylinder 4, Figs. 10 and 11, there is placed a valve that is capable of being actuated by any suitable means (it may be an eccentric, tappets, cams, or other equivalent devices) in such a manner that communication between the interior of the cylinder and the reservoir is opened and closed as required. Fig. 10 is a vertical section, and Fig. 11 a side elevation, showing an arrangement of this kind wherein 31 is a valve controlling a port 9*, arranged at the bottom of the cylinder 4 for placing the same in communication with the chamber 10. In this case the arrangement, as will be seen, is such that the piston 5 and stamp-head will be lifted through the medium of liquid 12, imprisoned below the piston, as in the arrangement shown in Figs. 1 to 8, and they are allowed to fall under the action of gravity and independently of the movement of the cylinder 4 by opening the valve 31, so as to establish free communication between the cylinder 4 and the reservoir 10. The cylinder is prolonged upward, so as to prevent its upper end coming in contact on the down-stroke with the piston in the event of the stamp-head being prevented from making its full downstroke, and at that point of the upper portion of the cylinder at which the piston will be located when a full stroke of the cylinder has been made there is an opening 11ª, between the cylinder and reservoir, through which liquid can pass in order that the stamp-head will not be raised until the relative normal position of piston and cylinder is reached, so that the stamp-head will never be raised beyond a predetermined height no matter what proportion of the full stroke it may have dropped, or in lieu of the port 11ª there may be a port 5ª in the piston 5, which is opened and closed by a rod, (see Fig. 12,) thus dispensing with the independent chamber. The controlling-valve 31 may be of any suitable type, such as a rotary valve having a slotted periphery, as shown, and be operated at the required times through an arm 31ª on its stem by moving tappets 32 32ª on a rod 33, worked from an eccentric on the driving-shaft or by fixed tappets. In each arrangement any one of the rods 6, with stamp-head 8, can, when desired, be held up or out of action without interfering with the working of the remainder in the series.

Obviously this invention will enable stamps to be operated more rapidly than has been found practicable where gravity alone has been relied upon for effecting the downward stroke, because, as is well known, in stamp-batteries of the kind in which the stamp-heads are allowed to fall through a distance of about seven inches by gravity and are raised by cams or wipers it has hitherto been impracticable to obtain more than from one hundred to one hundred and five blows per minute, and of the power expended a large proportion has been wasted in friction, whereas my invention renders it practicable to neutralize the retarding effect due to friction and, when necessary, to supplement the force due to gravity, thereby rendering it possible to obtain a greater number of blows per minute and a greater crushing capacity per stamp-head, while by obviating to a large extent sudden shocks the apparatus is also rendered less liable to break down than apparatus of the ordinary construction, and of the power expended a larger proportion may be usefully employed than heretofore has been usual.

It is an important feature of this improvement that the weight is raised at a known and predetermined point of the upstroke—viz., at the point when the bottom of the piston closes port 9—the body of imprisoned liquid remaining at a practically constant volume during the entire upstroke of the cylinder. This is a technical effect of great practical advantage, as if the weight was raised on a body of air, as in a pneumatic hammer, the factors determining the point at which the weight is raised depend on the weight of the stamp-head, the volume of air below the air-inlet port, and the upward velocity of the cylinder, each of which in a stamp-mill is a variable quantity. As the weight of the head decreases with the wearing of the shoe, the volume of air decreases with the lowering of the piston, due to the wearing of the shoe, and the upward velocity of the cylinder varies with the speed of revolution. On the point of pick-up relatively to the stroke of the cylinder depends the stroke of the stamp-head, and as the stroke is a factor in the crushing effect it follows that in a pneumatic stamp it is practically impossible to maintain a constant energy of blow per drop, and it is most essential for practical success in ore-crushing that the blows shall be of uniform effect, so as to produce a uniform output through the screens and minimize the quantity of slime or overcrushed material from which in gold mining it is most expensive to extract the gold. After the point of pick-up has been passed the cylinder continues to move upward, as the piston is supported on an incompressible body of liquid and as the working speed of revolution is such that the maximum upward velocity of the cylinder practically corresponds to the velocity which is required at that period in order that the stamp-head may complete its normal stroke under the influences of gravity and friction it follows that the piston is practically stationary within the cylinder during the entire upward stroke of the stamp-head. This is also an important technical effect, because it represents a higher mechanical efficiency than is possible in the case of pneumatic hammers, as when the cylinder in the latter arrives at the top of its stroke the energy stored up in the air which is compressed below the piston is wasted, because on the downstroke it produces by its expansion a diminution in the velocity of fall of the stamp-head and a consequent decreased efficient of mechanism. On the downstroke of the cylinder if its velocity is not less than the velocity which would result from a body falling under the influence of gravity the pressure on the liquid is entirely relieved and the stamp-head falls freely. The velocity of the cylinder decreases, however, after mid-stroke, but before it exercises a retarding effect on the velocity of the stamp-head the stroke of the latter is completed by its impact on the anvil. This is another technical effect, as in the case of pneumatic hammers the retarding effect of the air compressed below the piston must be neutralized by compression of air above the piston, and if the stroke of the stamp-head is shortened by coming in contact with a large piece of hard quartz the air above the piston continues to be compressed until the end of the stroke, when the pressure of air reaches a maximum, thereby resulting in a direct loss of energy and the production of heat.

The foregoing technical effects have reference to increased mechanical efficiency, but a most important practical advantage in apparatus in my invention results from ability to use a diameter of cylinder which will admit of a design of crushing-box, screens, and amalgamating accessories being adopted which have been found to be the most suitable for the successful milling of the ores—viz., a pitch of or distance between the stem of about ten inches and a total falling weight of from one thousand to twelve hundred pounds. This can be successfully accomplished by means of the liquid-supporting body, but with pneumatic hammers in order to raise a weight of twelve hundred pounds on a volume of air compressed from atmospheric pressure the diameter of the cylinder which is necessary prohibits the use of a design of crushing-box which has been found to result in maximum efficiency, while the great heat generated from the rapid compression of the air not only results in a great waste of energy, but increases to a very great extent the size and weight of the entire apparatus for a given output of crushed material.

As will be obvious, the essential feature of this apparatus renders it suitable not only for the purposes indicated, but also for operating dies for sharpening rock-drills and the like and for various other hammering purposes.

I reserve the right to modify details of construction to suit different requirements.

What I claim is—

1. Stamping apparatus comprising a gravity-stamp, driving apparatus therefor, a reciprocatory vessel connected to one of said parts and arranged above said stamp, a piston or plunger located within said vessel and connected to the other of said parts, a body of liquid located between the bottom of said vessel and piston or plunger, and means for automatically introducing liquid into the vessel below the piston to make good leakage whereby the reciprocating vessel and the piston are repeatedly positively connected by the liquid at exactly the same point substantially as described for the purpose specified.

2. Stamping apparatus comprising a gravity-stamp, driving apparatus therefor, a reciprocatory vessel connected to one of said parts and arranged above said stamp, a piston or plunger movable within said vessel and connected to the other of said parts, and a liquid-chamber connected by a port or passage with the space between the bottom of said vessel and said piston or plunger, said port or passage being arranged at a point above the bottom of said vessel and arranged to be opened and closed by downward and upward movements respectively of said vessel relatively to said piston substantially as described for the purposes specified.

3. In stamping apparatus, a stamp connected by a rod to a piston, a cylinder wherein said piston is located so as to be in frictional driving connection therewith, means for imparting a vertical reciprocatory motion to said cylinder, and a chamber or reservoir charged with liquid and adapted to be placed by a port or passage in communication with the space between the piston and cylinder-bottom at a point above the latter when said cylinder-bottom moves relatively away from said piston substantially as herein described for the purposes specified.

4. In stamping apparatus, a stamp connected by a rod to a piston, a cylinder wherein said piston is located, means for imparting to said cylinder a vertical reciprocating motion which may be of greater stroke than that of the stamp a chamber or reservoir charged with liquid, and a port or passage for placing said chamber or reservoir in communication with the space between the piston and cylinder-bottom at a point above the latter, said port or passage being arranged to be opened and closed by downward and upward movement of said cylinder relatively to said piston substantially as herein described for the purposes specified.

5. In stamping apparatus, a stamp connected to a piston, a cylinder wherein said piston is located, means for imparting a vertical reciprocating motion to said cylinder, a chamber or reservoir charged with liquid and means whereby communication between said chamber or reservoir and the space between the piston and cylinder-bottom can be opened at different positions of said piston relatively to said cylinder-bottom, thus changing the point at which the piston and cylinder are positively connected by said liquid substantially as herein described for the purpose specified.

6. In stamping apparatus a combined cylinder and liquid-chamber arranged side by side and the wall between the said cylinder and chamber being formed with two or more holes $9^a$ arranged at different heights above the bottom of said cylinder, valves for separately controlling each hole, means for imparting a vertical reciprocating motion to said combined cylinder and liquid-chamber, and a stamp connected to a piston located within said cylinder, substantially as herein described for the purpose specified.

7. In stamping apparatus a stamp connected by a rod to a piston, a cylinder wherein said piston is located, means for imparting a vertical reciprocating motion to said cylinder, a chamber or reservoir charged with liquid, a port or passage whereby said chamber or reservoir can be placed in communication with the space between the piston and cylinder-bottom, a valve for controlling said communication, and means for automatically opening and closing said valve, substantially as herein described for the purposes specified.

8. Stamping apparatus comprising a stamp 8, a piston 5, a rod connecting said stamp and piston, a vertically-guided cylinder 4 containing said piston, a chamber 10 carried by said cylinder and charged with liquid, ports 9 and 11 connecting said cylinder and chamber at points below and above said piston respectively, a vertically-guided rod connected to said cylinder, a rotary crank 1, a link 3 connecting said crank to the rod connected to said cylinder, and transverse guides through which said rods work, substantially as described.

9. Stamping apparatus of the kind herein referred to, comprising a stamp 8 with rod 6 and piston 5, a vertically-guided cylinder 4 containing said piston, a chamber 10 carried by said cylinder and charged with liquid, said chamber communicating with said cylinder above and below the piston therein through ports 9 and 11 in the cylinder-wall, a vertically-guided rod $3^a$ connected to said cylinder, a rotary crank 1, a link 3 connecting said crank and the rod $3^a$, transverse guides 16, $16^a$ through which said rods 6 and $3^a$ respectively work, and a sleeve 15 connected to said cylinder and arranged to surround said rod 6 so as to be located between the same and the guide 16, substantially as described for the purposes specified.

10. In stamping apparatus of the kind herein referred to, the combination with a stamp, a piston connected thereto, a cylinder 4 having a stuffing-box 7, and wherein said piston is located a liquid-containing chamber 13 connected by a port 9 with said cylinder, and means for reciprocating said cylinder and chamber of a pipe or conduit connecting said stuffing-box and chamber, substantially as described for the purpose specified.

In testimony whereof I have signed my name to this specification in the presence of two subscribing witnesses.

DONALD BARNS MORISON.

Witnesses:
   J. BAKEWELL STROVER,
   J. WILLIAMS.